United States Patent Office 3,578,406
Patented May 11, 1971

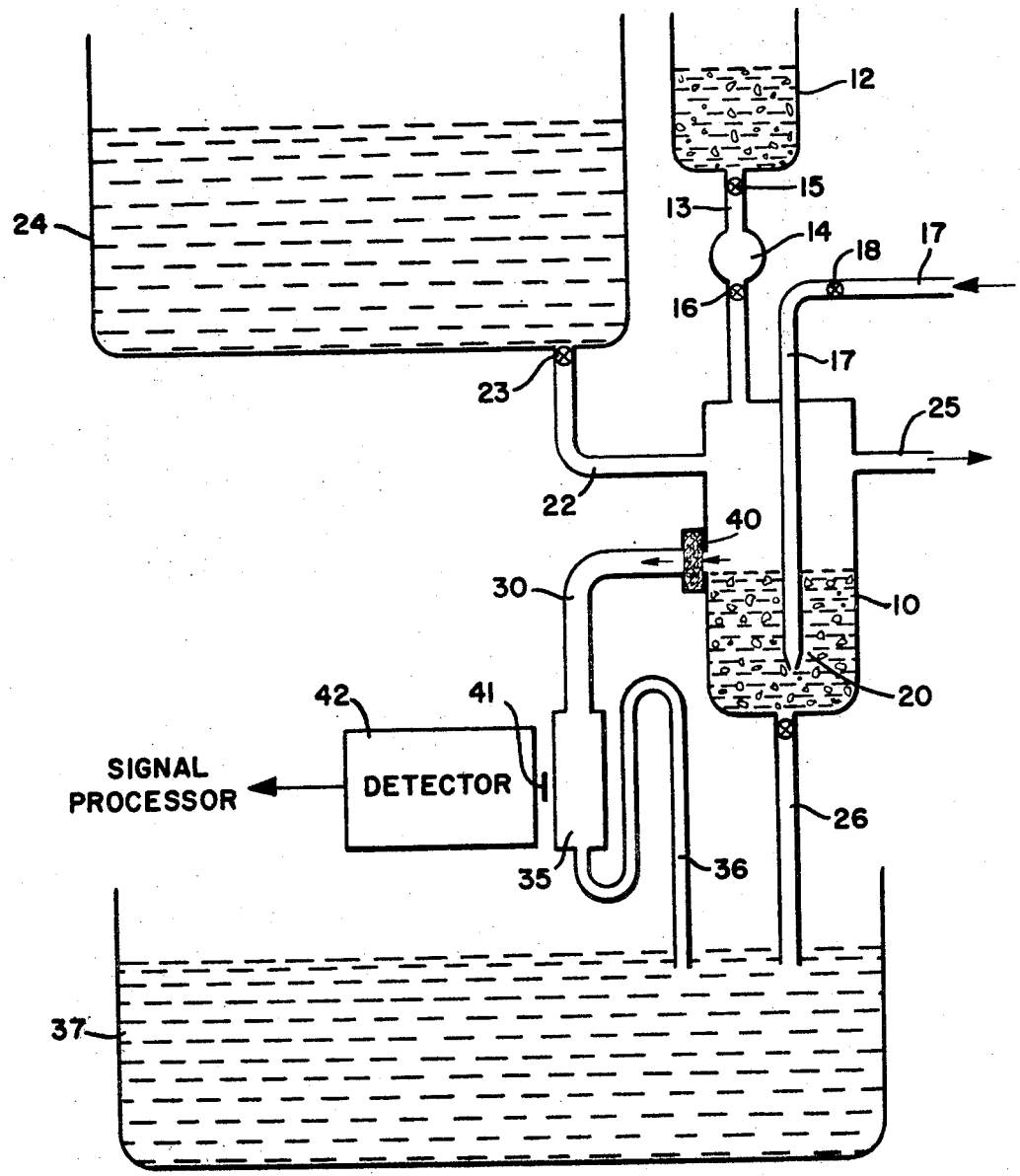

3,578,406
SULFUR DIOXIDE MEASUREMENT SYSTEM
Boong Y. Cho and Larry B. Anderson, Columbus, Ohio, assignors to the United States of America as represented by the United States Atomic Energy Commission
Filed Mar. 3, 1969, Ser. No. 803,642
Int. Cl. G01n 23/00
U.S. Cl. 23—232
10 Claims

ABSTRACT OF THE DISCLOSURE

A quantitative determination of relatively small or trace amounts of gaseous sulfur dioxide involves a reaction between mercurous chloride and sulfurous acid, the latter formed when sulfur dioxide is dissolved in water. One of the reaction products is a water soluble bis-sulfitomercurate complex, the mercurate being easily removable from the remainder of the reaction mixture. The conversion of sulfur dioxide to the bis-sulfitomercurate complex is about 95% complete. By nucleonically detecting the amount of the bis-sulfitomercurate complex, which contains a metal having a high Z number (atomic number), using a monoenergetic source of nuclear radiation in the range of 15 to 25 kev., the amount of the complex is determinable and easily compared against a known standard sample either electronically or visually. The present system may be used on a continuously flowing gas such as stack gas, in which event it is unnecessary to scrub the gas, and permitting accurate determination of trace amounts of sulfur dioxide by monitoring or controlling the gas flow rate.

BACKGROUND OF THE INVENTION

The present invention relates to an improved method for the quantitative determination of sulfur dioxide gas by using a specific chemical reaction to convert the gas, or a simple product thereof, to a heavy metal complex which is nucleonically detectable.

Recently, considerable attention has been given to sulfur dioxide as a pollutant in air. Whenever fossil fuels of high sulfur content are used to produce energy in high density populated areas, and under certain adverse meteorological conditions, e.g., temperature inversions, there has been a problem of sulfur dioxide contamination. In order to control or monitor the amount of sulfur dioxide in the initial source such as stack gas, or the amount removed by any removal process, an accurate and preferably continuous system for the quantitative determination of sulfur dioxide gas should be provided.

DESCRIPTION OF THE PRIOR ART

It is known to use a radioisotope of iodine in the form of $KI^{131} O_3$, and to react this material with sulfur dioxide in the presence of water. When the solution of the reaction product is acidified, free $I_2^{131}$ is released. The free radioisotope is extracted in chloroform and counted with a well-type scintillation counter to determine the amount of free radioisotope. By this method, reported in Radioactive Methods of Aanalysis (1965), volume II, pages 285–293, as little as $10^{-4}$ p.p.m. of sulfur dioxide can be detected.

While the above method is more sensitive than other methods, e.g., a sensitivity of .01 p.p.m., its disadvantage is its sensitivity to interferants such as hydrogen sulfide and the short half-life of radioactive iodine, which is 8.05 days. For continuous on-line measurement systems, the half-life of this isotope or of the $I^{125}$ isotope is too short.

Even the direct X-ray fluorescense analysis of sulfur doxide is difficult in that the K-X-rays of sulfur are too low in energy, and other sulfur contaminants interfere. X-ray analysis systems for various materials are known, see for example U.S. Pat. No. 3,114,832, issued Dec. 17, 1963 and U.S. Pat. No. 3,270,200, issued Aug. 31, 1966.

SUMMARY OF THE INVENTION

In accordance with the present invention, the above disadvantages are overcome by utilizing a specific chemical reaction which converts the sulfur dioxide, or its simple conversion product, to a water soluble heavy metal ion complex in which the metal has a relatively high Z number.

Briefly, the sulfur dioxide is passed through an aqueous mixture containing mercurous chloride which is insoluble in the aqueous medium. The sulfur dioxide, in water, forms sulfurous acid which in turn reacts with the mercurous chloride to form mercury metal and a water soluble bis-sulfitomercurate complex containing the heavy metal, mercury, the latter having a high Z number. Since the complex is soluble, it is easily removed from the reaction mixture containing the insoluble mercurous chloride.

In a continuous on-line system, a portion of the source of sulfur dioxide gas, such as stack gas, is passed through an aqueous solution for determination as above described. The rate of flow is either monitored or controlled by use of a pump of known capacity or by a flow meter so that the amount of the sample being analyzed is known.

Quantitative determination of the bis-sulfitomercurate complex is accomplished nucleonically either by measurement of attenuation of nuclear radiation by the sample, or by measuring the excited L-X-rays of mercury which are detected by a suitable radiation detector system, such as sodium iodide crystals or a proportional counter. The source of penetrating radiation is preferably a monoenergetic source having an energy in the range of 15 to 25 kev., the lower portion of the range being just above the L absorption edge of mercury.

Accordingly, it is an object of the present invention to provide an improved nucleonic method for the quantitative determination of small and trace amounts of sulfur dioxide.

Another object of the present invention is to provide a method, as above described, wherein sulfur dioxide is converted to sulfurous acid and reacted with mercurous chloride to form a water soluble heavy metal complex the percentage of which is nucleonically detected as a function of the amount of sulfur dioxide in the sample.

Another object of the present invention is the provision of an improved method for the quantitative determination of sulfur dioxide in a sample, for example, stack gas wherein a portion of the stack gas is passed through an aqueous mixture containing mercurous chloride to convert the sulfur dioxide into a bis-sulfitomercurate complex, and wherein the complex is nucleonically determined in a quantitative manner by a monoenergetic source of penetrating radiation in the energy range of 15 to 25 kev.

Other objects and advantages of the present invention will be apparent from the following description, the accompanying drawing and the appended claims.

BRIEF DESCRIPTION OF THE DRAWING

The single drawing shows schematically the system for carrying out the method of the present invention.

DESCRIPTION OF THE PREFERRED EMBODIMENT

Referring to the drawing, which illustrates one form of the system for carrying out the method of the present invention, a reaction chamber 10 is shown with multiple inlet and outlet conduits for introducing reagents and samples and for withdrawing reaction products. Mounted above the reaction chamber 10 is a reactant reservoir 12 interconnected to the chamber by conduit 13 provided with a simple metering device formed by the enlarged ball section 14 and valves 15 and 16. By opening valve 15 to fill the metering ball 14, then closing 15 and opening 16, a predetermined amount of reactant is introduced into the chamber 10. The valves 15 and 16 may be manually or automatically controlled.

A sample of gas to be analyzed is introduced into the chamber 10 through an inlet conduit 17 controlled by valve 18, the end of the conduit being below the reaction mixture 20 which is in the chamber 10 and at a level approximately as shown. Thus, incoming gas is bubbled through the reaction mixture 20. Water or other aqueous solution is introduced into the chamber 10 through conduit 22 controlled by valve 23, the conduit 22 being connected to a supply of water such as a tank 24, as shown or a water main. Chamber 10 is also provided with a gas outlet conduit 25 and a valve controlled purging line 26 for emptying the chamber in the event this is needed.

Chamber 10 is also equipped with a side arm 30 through which soluble portions of the reaction mixture may flow, the arm 30 being connected to a measurement cell 35 provided with a trap 36 and emptying into a drop chamber 37 which also runs the effluent from the purge line 26. Positioned in the side arm 30 is a filter 40 which prevents solid elements of the reaction mixture from passing into the measurement cell 35.

Nucleonic determination of the material in the measurement cell 35 is conducted by a source 41 and a detector 42 connected to a signal processing apparatus, not shown. In practice a predetermined amount of mercurous chloride is measured into the reaction chamber 10. This is done by first opening valve 15 to fill the bulb 14 between valves 15 and 16. After valve 15 is closed, valve 16 is opened to fill the reaction chamber with a fixed quantity of mercurous chloride. Water or aqueous solution is fed into the reaction chamber from the reservoir 24 and the solution flow rate is controlled by a proper adjustment of the valve 23. After the reaction chamber is filled with the solution to the level indicated, stack gas is bubbled through the solution using gas inlet and outlet tubings 17 and 25, respectively. As the gas is bubbled through the solution, the following reaction occurs:

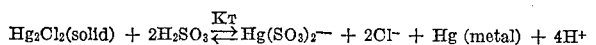

Mercurous chloride or calomel is a white solid that is practically insoluble in water (2 to 10 $\mu$g. of $Hg_2Cl_2$ is soluble in 1 cm.$^3$ of water). When sulfite ions are introduced into the solution, however, the above reaction will proceed, forming a water-soluble bis-sulfitomercurate complex, $Hg(SO_3)_2^-$.

The solution is then fed into the measurement cell 35 through the filter 40, separating unreacted mercurous chloride and metallic mercury from the solution of $Hg(SO_3)_2^-$ ions. The level of the solution mixture in the absorption cell is maintained so that the cell is filled with at least 8 cm.$^3$. As mercurous chloride is consumed, the volume of water will gradually increase and reach a maximum. When the original charge of mercurous chloride is completely consumed, some metallic mercury will remain in the cell. This is drained off through valve in line 26 together with any solid contaminants that might have been collected from the stack gas during the operation.

For example, if stack gas is bubbled through the absorption cell at a rate of 0.15 l./minute, and at an $SO_2$ concentration of 2000 p.p.m., about 0.8 mg. of $SO_2$ is absorbed per minute. This will consume $H_2Cl_2$ at a rate of 2.8 mg./minute and dissolve 1.2 mg. of mercury each minute. Thus, 30 gm. (about 4 cm.$^3$) of $Hg_2Cl_2$ measured into the cell initially will last over a week, and the filtered solution will have a mercury concentration of 1.2 mg./cm$^3$.

The detection of the mercury concentration in the measurement cell can be made by counting mercury L-X-ray photons that are excited by a source 41. The source is preferably a monoenergetic source in the range of 15 to 25 kev., the lower end of this range being just above the L absorption edge of mercury. Other sources which may be used include an Americium source 241 isotope with a silver target to produce X-radiation of an energy of about 22 kev., or AM-241 with a molybdenum target which provides X-radiation of about 17.5 kev. The Cd-109 source also provides silver K-X-rays. The mercury L-X-ray photons are detected by a sodium iodide crystal in the detector, the latter including a photomultiplier tube to provide an electrical signal. A proportional counter may also be used to provide an electric signal.

The use of a monoenergetic source has the advantage of reducing noise which exists with a continuous energy source.

The signal from the detector provides an indication of the quantity of heavy metal, mercury, in the sample. Since the conversion of $SO_2$ to the bis-sulfitomercurate complex is about 95% complete, the signal is representative of the amount of $SO_2$ in the sample being analyzed. Lesser amounts of conversion may be used but for maximum sensitivity the reaction should be at least 70% complete. Since the present invention is concerned with small or trace amounts of $SO_2$, the temperature dependent solubility of $SO_2$ is not a factor since the solubility of 22.8 grams of $SO_2$ per 100 ml. of water at 0° C. is far greater than the trace amounts to be determined by the present invention.

A portion of the stack gas may be analyzed using a standard sampling technique such as through a sampling tube, and where a continuous system is used, the flow rate of the gas should be controlled or monitored. This is easily accomplished by means well known, per se, so that knowing the rate of flow of the sample, the amount of gas in the sample may be calculated electronically or by other means.

The formation of a soluble complex of mercury has several advantages; first, it allows relatively easy separation of components of the mixture, and secondly, mercury having a relatively high Z number is a good attenuator of penetrating radiation so that nucleonic attenuation measurement techniques may be used, in which case the detector measures the amount of radiation which comes through the sample being analyzed, and the amount of mercury in the complex is detected by the absorption of radiation. Where attenuation measurement is conducted, the sample is between the source and detector. As indicated, this chemical reaction is essentially an equilibrium reaction, with a calculated constant, $K_T$, of $4.9 \times 10^{-6}$ (moles/liter)$^{+5}$. The continuous removal of the soluble mercury complex has the effect of shifting the equilibrium to the right thus assuring virtually complete formation of the mercury complex.

It has also been disclosed that the use of a buffer solution which is added dropwise to a water source or added to a supply in an amount sufficient to control the pH prevents large changes in pH as the reaction proceeds in the cell 10. It has been calculated that the exchange reaction is more than 95% complete at any hydrogen ion concentration of less than $5.4 \times 10^{-2}$ M.

It will be apparent to those skilled in the art that apparatus other than that herein described may be used to practice the method herein disclosed.

While the method herein described constitutes a preferred embodiment of the invention, it is to be understood that the invention is not limited to this precise method, and that changes may be made therein without departing from the scope of the invention.

What is claimed is:

1. A nucleonic method for the quantitative determination of sulfur dioxide gas in a sample comprising the steps of bringing at least a portion of said sample containing an unknown amount of said gas into contact with an aqueous mixture containing mercurous chloride, said sulfur dioxide being converted to sulfurous acid and reacting with said mercurous chloride to form a water soluble bis-sulfitomercurate complex and other reaction products, the amount of said bis-sulfitomercurate complex formed being proportional to the amount of sulfur dioxide in said sample, separating the solution containing said water soluble bis-sulfitomercurate complex from said mercurous chloride and said reaction products, exposing said solution to nucleonic radiation, and detecting radiation received from said solution, said detected radiation being a function of the amount of bis-sulfitomercurate complex present therein and indicative of the amount of sulfur dioxide gas in said sample.

2. The method as set forth in claim 1 wherein said sample is a continuous flowing gas, and wherein said detected radiation is a continuous indication of the amount of sulfur dioxide in said sample.

3. The method as set forth in claim 1 wherein said aqueous mixture contains a buffer for preventing substantial changes in pH.

4. The method as set forth in claim 1 wherein said sample is continuously flowing stack gas, said method including the step of continuously bringing a portion of said stack gas into contact with said aqueous mixture, and wherein about 95% of the sulfur dioxide brought into contact with said mixture reacts to form said bis-sulfitomercurate complex.

5. The method as set forth in claim 1 wherein said nucleonic radiation has an energy in the range of 15 to 25 kev.

6. The method as set forth in claim 5 wherein said step of detecting radiation from said solution includes detecting the radiation transmitted through said solution as an indication of the amount of sulfur dioxide in said sample.

7. The method as set forth in claim 1 wherein said nucleonic energy is monoenergetic radiation in the range of 15 to 25 kev.

8. The method as set forth in claim 7 in which nucleonic radiation striking said mercury atom in said solution releases an L-X-ray and wherein the step of detecting said radiation includes detecting said release of L-X-rays with a proportional counter to provide a radiation count which is proportional to the amount of mercury in said solution and indicative of the amount of sulfur dioxide gas in said sample.

9. The method as set forth in claim 1 wherein said sample is a gas flowing at a given rate, and wherein said method includes the step of monitoring the rate at which said gas flows.

10. The method as set forth in claim 9 wherein said sample is stack gas flowing at a given rate, and wherein said method includes the step of monitoring the rate at which said satck gas flows.

References Cited
UNITED STATES PATENTS

| | | | |
|---|---|---|---|
| 2,736,638 | 2/1956 | McConnaughey | 23—232 |
| 2,797,983 | 7/1957 | Greenspan | 23—232 |
| 3,366,574 | 1/1968 | Chleck | 23—232X |
| 3,433,580 | 3/1969 | Deuringer | 23—232X |

OTHER REFERENCES

Chemical Abstracts, 63:P17158g (1965).

A. J. Moses, "Nuclear Techniques in Analytical Chemistry," 102–103, MacMillan Co., New York, 1964.

JOSEPH SCOVRONEK, Primary Examiner

SIDNEY MARANTZ, Assistant Examiner

U.S. Cl. X.R.

23—230, 254; 250—43.5, 83.6, 106